United States Patent
Klop et al.

(10) Patent No.: US 12,275,374 B2
(45) Date of Patent: Apr. 15, 2025

(54) VEHICLE POWER RUNNING BOARD HAVING ADAPTIVE MOTOR TORQUE

(71) Applicant: Ford Global Technologies, LLC, Dearborn, MI (US)

(72) Inventors: Aaron Peter Klop, Bloomfield Hills, MI (US); Dennis Yee, Milford, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 398 days.

(21) Appl. No.: 18/073,740

(22) Filed: Dec. 2, 2022

(65) Prior Publication Data
US 2024/0181968 A1    Jun. 6, 2024

(51) Int. Cl.
*B60R 3/02*    (2006.01)
(52) U.S. Cl.
CPC .................................. *B60R 3/02* (2013.01)
(58) Field of Classification Search
CPC .............................. B60R 3/02; B60R 3/002
See application file for complete search history.

(56) References Cited

U.S. PATENT DOCUMENTS

| | | | | |
|---|---|---|---|---|
| 4,784,975 | A  * | 11/1988 | Hofmann | H01L 21/02238 438/770 |
| 6,926,295 | B2 * | 8/2005  | Berkebile | B60R 3/02 280/166 |
| 7,584,975 | B2 * | 9/2009  | Leitner | B60R 3/02 280/166 |
| 9,802,545 | B1 * | 10/2017 | Salter | B60R 3/002 |
| 10,513,224 | B2 | 12/2019 | Smith | |
| 11,208,044 | B2 | 12/2021 | Smith et al. | |
| 2017/0021781 | A1 | 1/2017 | Du et al. | |
| 2018/0297530 | A1 | 10/2018 | Stickles et al. | |

* cited by examiner

*Primary Examiner* — Bryan A Evans
(74) *Attorney, Agent, or Firm* — Vichit Chea; Price Heneveld LLP

(57) ABSTRACT

A vehicle running board assembly includes a step board, a movable arm coupled to the step board, an electric motor operably coupled to the movable arm to actuate the step board between stowed and use positions and a controller controlling the electric motor, wherein the controller controls the electric motor based on sensed temperature and a motor cycle count.

20 Claims, 2 Drawing Sheets

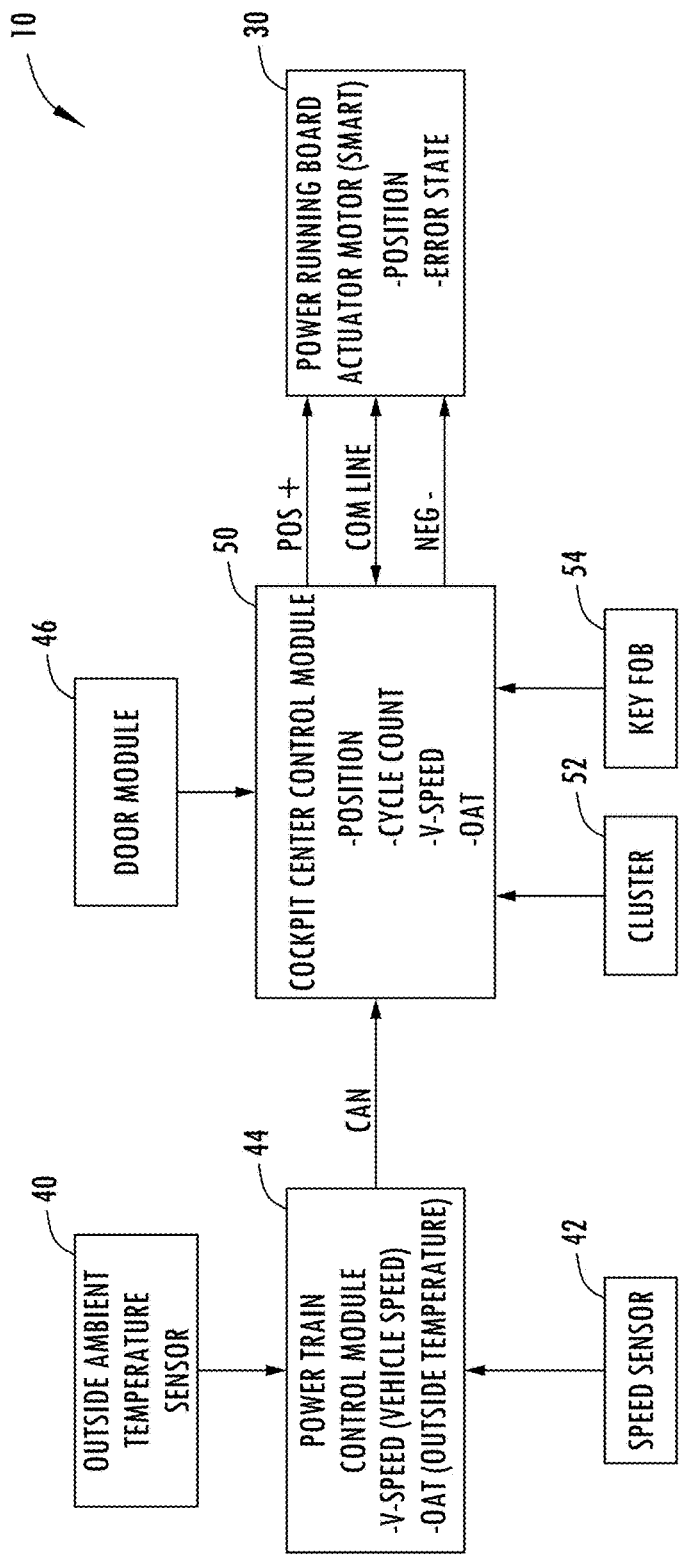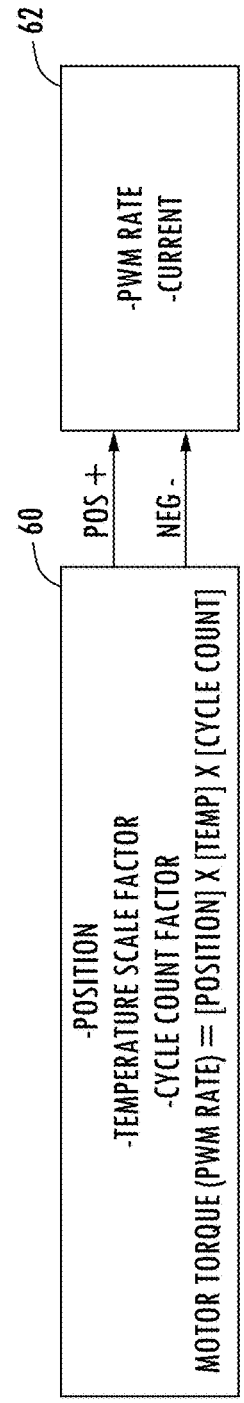

VEHICLE POWER RUNNING BOARD HAVING ADAPTIVE MOTOR TORQUE

FIELD OF THE DISCLOSURE

The present disclosure generally relates to vehicle power running boards, and more particularly relates to controlling an electric motor operating a power running board.

BACKGROUND OF THE DISCLOSURE

Motor vehicles are commonly equipped with powered accessories, such as power running boards, which are operable to deploy and retract generally below a vehicle access door. The power running board commonly includes an actuator, such as an electric motor to actuate a step board. It may be desirable to provide for enhanced operation of the electric motor for operating the power running board.

SUMMARY OF THE DISCLOSURE

According to a first aspect of the present disclosure, a vehicle power running board assembly is provided. The vehicle power running board assembly includes a step board, a movable arm coupled to the step board, an electric motor operably coupled to the movable arm to actuate the step board between stowed and use positions, and a controller controlling the electric motor, wherein the controller controls the electric motor based on a sensed temperature and a motor cycle count.

Embodiments of the first aspect of the present disclosure can include any one or a combination of the following features:
  the electric motor comprises a brush type DC electric motor;
  a temperature sensor input for receiving the sensed temperature;
  a motor cycle counter counting use cycles of the electric motor;
  the controller controls a motor drive current;
  the controller controls a pulse width modulation signal rate;
  the drive current is increased as the cycle count increases;
  the drive current is scaled based on the sensed temperature;
  the driver current is decreased based on temperature; and
  a gear train operatively coupling the electric motor and the movable arm.

According to a second aspect of the present disclosure, a vehicle running board assembly is provided. The vehicle running board assembly includes a step board, a movable arm coupled to the step board, an electric motor operably coupled to the movable arm to actuate the step board between stowed and use positions, a motor cycle counter counting use of the electric motor, a temperature sensor sensing ambient temperature, and a controller controlling the electric motor, wherein the controller controls a motor drive current applied to the electric motor based on sensed ambient temperature and motor cycle count.

Embodiments of the second aspect of the present disclosure can include any one or a combination of the following features:
  the electric motor comprises a brush type DC electric motor;
  the controller controls a pulse width modulation signal rate; and
  the drive current is increased as the cycle count increases.

According to a third aspect of the present disclosure, a method of controlling a power running board on a vehicle is provided. The method includes the steps of receiving an activation signal for requesting actuation of the power running board with an electric motor, sensing temperature, determining a motor cycle count of use of the electric motor, and actuating the electric motor by applying a motor drive circuit based on the sensed temperature and the determined motor cycle count to move the power running board between use and deployed positions.

Embodiments of the third aspect of the present disclosure can include any one or a combination of the following features:
  the controller controls a pulse width modulation signal rate;
  the drive current is increased as the cycle count increases;
  the drive current is scaled based on the sensed temperature;
  the driver current is decreased based on temperature; and
  a gear assembly operatively coupling the electric motor and the movable support.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 3 is a block diagram illustrating a controller architecture for controlling the electric motor to actuate the power running board; and FIG. 4 is a block/flow diagram illustrating control for operating the electric motor to actuate the power running board.

DETAILED DESCRIPTION OF PREFERRED EMBODIMENTS

Figure 1:
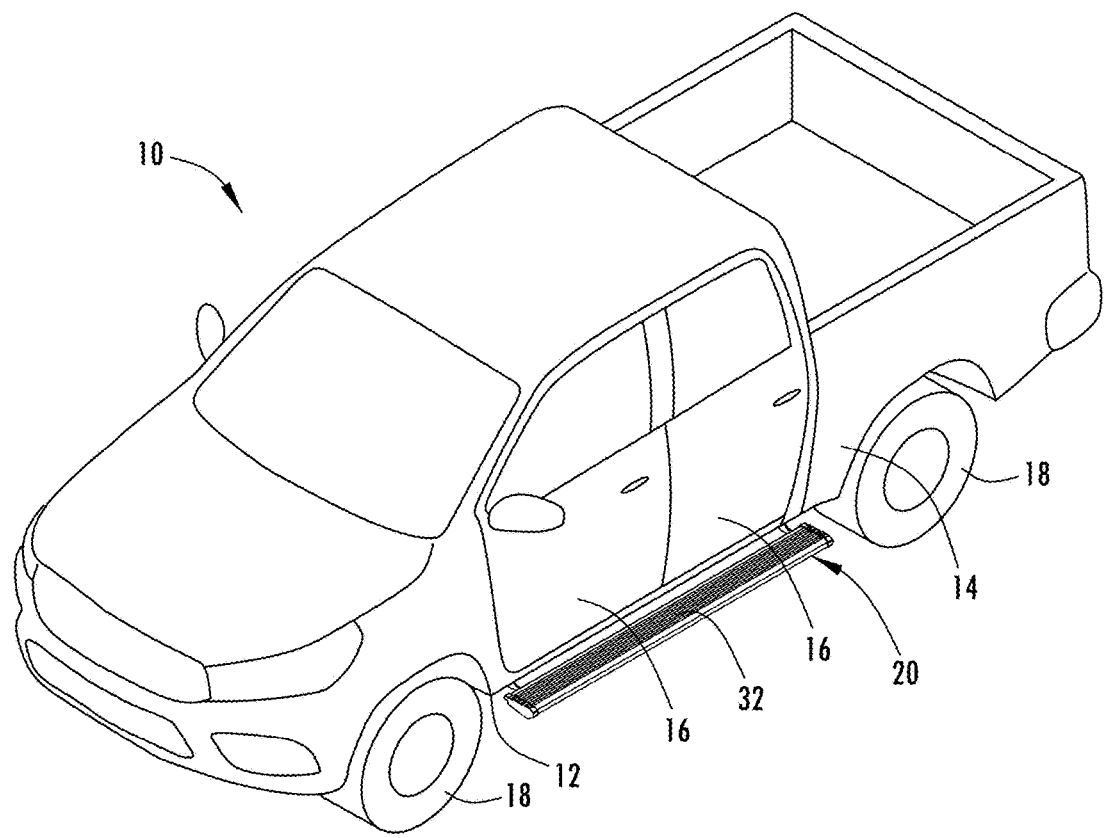
FIG. 1 is an upper perspective view of a vehicle having a power running board shown in a deployed position.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle running board assembly and method of controlling the electric motor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a vehicle body 14 that generally defines a cabin interior configured with vehicle seats or seating for transporting passengers in the vehicle 10. The vehicle body 14 is generally supported on a vehicle frame 12. In the example shown, the motor vehicle 10 has a plurality of road wheel assemblies 18 for allowing transportation on a roadway. The vehicle 10 further includes a plurality of vehicle access doors 16 such as, for example, four side passenger doors as shown with two doors on each opposite lateral side of the vehicle 10. Each of the doors 16 may close a space such as a space of the cabin interior in the closed door position and allow access to the cabin interior in an open door position. The doors 16 are typically located proximate to front and rear rows of seating within the cabin interior. The doors 16 may include manual or power actuated doors that rotate outward about hinges or slide on a track between to open and closed door positions.

The motor vehicle 10 is further equipped with a power running board assembly 20 located on each of the opposite lateral sides of the vehicle 10. The power running board assembly 20 is shown in FIG. 1 on one side of the vehicle 10 connected to the frame 12 and generally positioned proximate and below the side access doors 16. The power running board assembly 20 has a step board 32 power actuated by an electric motor to be moved laterally outward and downward from the vehicle body and frame to a deployed use position as shown in FIG. 1 in which one or more passengers may step on the power running board for assistance in accessing or exiting the vehicle 10 with at least one of the side doors 16 in the open door position. The step board 32 of the power running board assembly 20 is retractable to a retracted stowed position by moving upwards and laterally inwards and proximate to the frame 12 and generally below the body 14. As such, the power running board 20 may be actuated via the electric motor actuator to move the step board 32 between the deployed and stowed positions in response to sensing a door opening or closing, a passenger approaching or departing from the vehicle, or a user input, for example, such as a key fob input.

Figure 2:
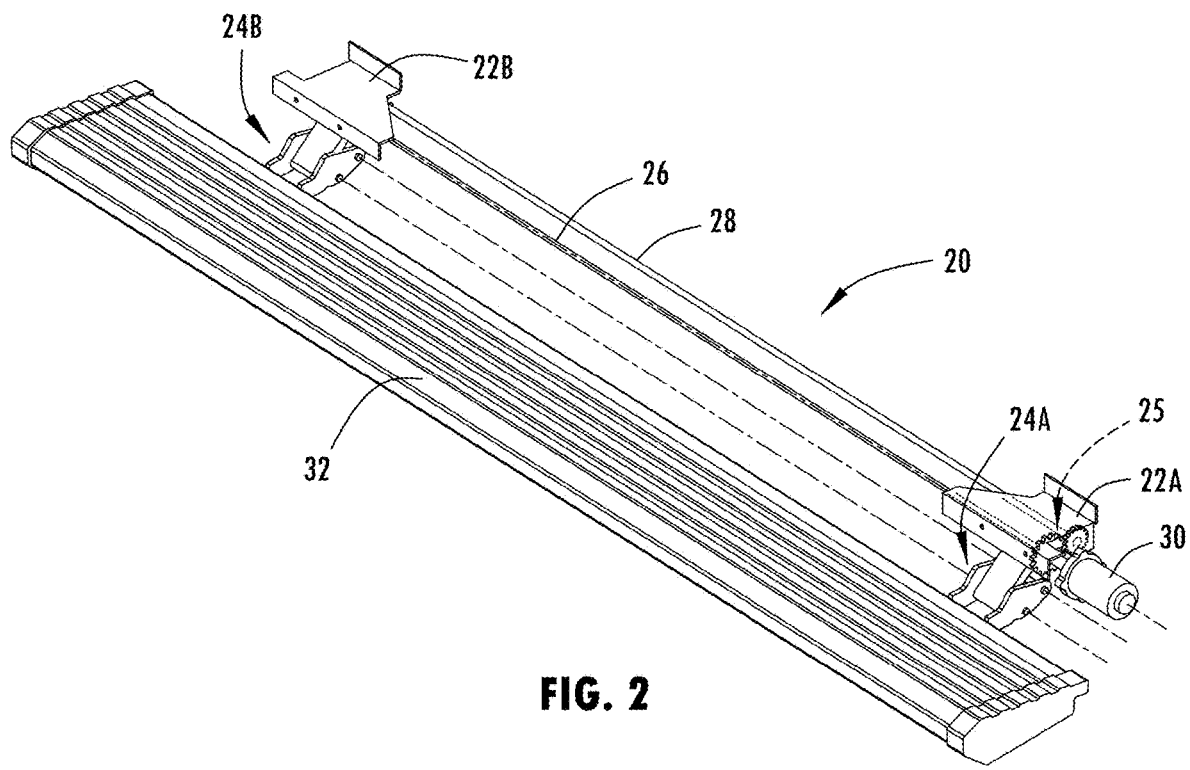
FIG. 2 is an enlarged upper perspective view of the power running board shown in FIG. 1 in the deployed position.

The power running board assembly 20 is illustrated in FIG. 2, according to one example. The power running board assembly 20 includes the step board 32 having an upper surface generally configured to receive and hold the feet of a passenger exiting or entering the vehicle when the running board assembly 20 is in the deployed position. The step board 32 is generally planar on top and has a length sufficient to extend below the side doors 16 on the lateral side of the vehicle 10. The step board 32 is operatively coupled to a pair of mounting brackets 22A and 22B via at least one support arm shown in one example having a pair of pivoting support arms 24A and 24B, respectively. The mounting brackets 22A and 22B are configured to be attached to the frame 12 of the vehicle 10 via connectors, such as fasteners, for example a plurality of bolts. The pivoting support arms 24A and 24B include support members that pivot to allow the step board 32 to move from the outward extended deployed position to the inward stowed position. Actuation of the pivoting support arms 24A and 24B and step board 32 is achieved with an electric motor 30 that actuates a gear train 25, according to one example. The gear train 25 may include one more gears configured to actuate a drive arm 26 relative to a follower arm 28. It should be appreciated that mechanical arrangements other than a gear train and pivoting support arms may be employed to actuate the step board 32 between the stowed and use positions with the use of an electric motor 30.

The motor 30 is shown connected to the gear train 25 proximate to mounting bracket 32, according to one example. The drive and follower arms 26 and 28 extend from the first mounting bracket 22A to the second mounting bracket 22B and allow movement of the step board 32 between the stowed and use positions. The electric motor 30 provides the actuation force to actuate pivoting support arms 24A and 24B. As such, the pivoting support arms 24A and 24B move in sync as the step board 32 is moved between the deployed and retracted positions.

The electric motor 30 may be a brush-type direct current (DC) electric motor that receives a DC electric current and generates an output torque, according to one exemplary embodiment. The output torque is applied to the gear train 25 to actuate the step board 32. The electric motor 30 may generate an output torque in a first direction to move the step board 32 towards the outward deployed position and in a second opposite direction to move the step board 32 towards the inward stowed position. The electric motor 30 advantageously is controlled with a control module pursuant to a control strategy that compensates for the effects of cold weather and motor wear, such as motor brush wear, for example, on the motor output torque. As such, as the electric motor 30 experiences wear and tear during use, and when environmental factors, such as temperature as well as dirt and corrosion adversely affect the drive torque, the control strategy provides enhanced motor performance.

The control strategy for controlling the electric motor 30 is illustrated in FIGS. 3 and 4. As seen in FIG. 3, the vehicle 10 employs an outside ambient temperature sensor 40 to sense the ambient temperature outside of the vehicle 10 proximate to the vehicle 10 which is generally indicative of the temperature exposed to the electric motor 30. In addition, a vehicle speed sensor 42 provides vehicle speed data. The ambient temperature and speed data are supplied to the powertrain control module 44 which, in turn, communicates the vehicle speed and outside temperature data via a communication bus, such as a CAN bus, to a cockpit center control module 50. The cockpit center control module 50 receives and stores the vehicle speed and outside temperature data in addition to receiving a door position signal from a door module 46 and a cycle count indicative of the number of times the power running board and electric motor have been powered on or cycled throughout a historical time period. The cockpit center control module 50 also communicates with a cluster 52 which may include various inputs and a key fob 54.

The cockpit center control module 50 includes a controller, which may include a microprocessor and/or other control circuitry and memory for storing one or more algorithms or control routines. The cockpit center control module 50 operates as a controller to control the power running board electric motor 30 based on activation commands which may be received from a user input such as from the key fob, door open or closed signal in the door module, or a detected state of a passenger desiring to enter or exit the vehicle. The power running board electric motor is controlled by applying a DC electric power supplied from the vehicle battery via the positive (pos. +) and negative (neg. −) power terminals. In addition, the power running board motor may communicate with the cockpit center control module 50 via a communication line. The communication line may provide communication to the power running board electric motor and may receive information such as a cycle counter increment to increase the cycle count number with each use with the control module 50.

The controller advantageously controls the electric motor as shown in FIG. 4, according to one embodiment. The controller generates a motor torque in control block 60 which may include a motor torque signal having a pulse width modulation (PWM) rate and a current 62. The control of the electric motor 30 is based on the position of the step board, the temperature scaling factor based on the sensed outside temperature and a cycle counter factor based on the cycle count. The motor torque PWM rate is determined by the position multiplied by the temperature scale factor and the cycle counter factor. As such, the controller controls the electric motor based on the sensed temperature and the motor cycle count. This advantageously provides for compensation to adjust the motor torque due to motor brush wear and cold temperature, for example.

The cycle counter factor may be determined by an algorithm, such as an equation or a lookup table, such as Table 1 listed below.

| # Cycles | Drive Current MA |
| --- | --- |
| 500 | 5600 |
| 1000 | 5500 |
| 2500 | 5700 |
| 10000 | 6000 |
| 25000 | 6000 |
| 50000 | 7000 |
| 100000 | 8000 |

The drive current applied to the electric motor may be scaled based on the ambient temperature which may include a temperature scale factor provided in Table 2 shown below.

| Temp Range Degree C. | Current Scale Factor |
| --- | --- |
| 40-0 | 1.1 |
| 0-20 | 1 |
| 20-50 | 0.9 |

Accordingly, the motor torque signal may be generated based on the cycle counter factor and temperature scale factors provided in lookup Tables 1 and 2 above. It should be appreciated that in the lookup table, the cycle count and ambient temperature may be used in an equation or algorithm to otherwise generate a motor torque based on a function of the motor cycle count and sensed temperature. In the example shown, the motor torque is increased when cycle count increases and/or the temperature decreases.

Accordingly, the vehicle power running board assembly 20 advantageously provides for control of an electric motor 30 for actuating the step board 32 between stowed and use positions in a manner that compensates for degradation that may occur due to wear on the electric motor 30 over time due to usage and for the adverse effects of temperature, such as cold temperature. By compensating for the cycle count wear and tear and temperature, the electric motor 30 advantageously provides for sufficient output torque to effectively actuate the step board 32 between the deployed and use positions. It should be appreciated that the electric motor control scheme may be used to control and actuate other electrically powered devices on the vehicle that are cycled on and off, according to other embodiments.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle power running board assembly comprising:
   a step board;
   a movable arm coupled to the step board;
   an electric motor operably coupled to the movable arm to actuate the step board between stowed and use positions; and
   a controller controlling the electric motor, wherein the controller controls the electric motor based on a sensed temperature and a motor cycle count.

2. The vehicle running board assembly of claim 1, wherein the electric motor comprises a brush type DC electric motor.

3. The vehicle running board assembly of claim 1 further comprising a temperature sensor input for receiving the sensed temperature.

4. The vehicle running board assembly of claim 1 further comprising a motor cycle counter counting use cycles of the electric motor.

5. The vehicle running board assembly of claim 1, wherein the controller controls a motor drive current.

6. The vehicle running board assembly of claim 5, wherein the controller controls a pulse width modulation signal rate.

7. The vehicle running board assembly of claim 6, wherein the drive current is increased as the cycle count increases.

8. The vehicle running board assembly of claim 7, wherein the drive current is scaled based on the sensed temperature.

9. The vehicle running board assembly of claim 8, wherein the driver current is decreased based on temperature.

10. The vehicle running board assembly of claim 1 further comprising a gear train operatively coupling the electric motor and the movable arm.

11. A vehicle running board assembly comprising:
    a step board;
    a movable arm coupled to the step board;
    an electric motor operably coupled to the movable arm to actuate the step board between stowed and use positions;
    a motor cycle counter counting use of the electric motor;
    a temperature sensor sensing ambient temperature; and
    a controller controlling the electric motor, wherein the controller controls a motor drive current applied to the electric motor based on sensed ambient temperature and motor cycle count.

12. The vehicle running board assembly of claim 11, wherein the electric motor comprises a brush type DC electric motor.

13. The vehicle running board assembly of claim 11, wherein the controller controls a pulse width modulation signal rate.

14. The vehicle running board assembly of claim 13, wherein the drive current is increased as the cycle count increases.

15. A method of controlling a power running board on a vehicle, the method comprising:
    receiving an activation signal for requesting actuation of the power running board with an electric motor;
    sensing temperature;
    determining a motor cycle count of use of the electric motor; and
    actuating the electric motor by applying a motor drive current based on the sensed temperature and the determined motor cycle count to move the power running board between use and deployed positions.

16. The method of claim 15, wherein the controller controls a pulse width modulation signal rate.

17. The method of claim 16, wherein the drive current is increased as the cycle count increases.

18. The method of claim 17, wherein the drive current is scaled based on the sensed temperature.

19. The method of claim 18, wherein the driver current is decreased based on temperature.

20. The method of claim 15 further comprising a gear assembly operatively coupling the electric motor and the movable support.

* * * * *